(12) United States Patent
Uehara et al.

(10) Patent No.: US 9,403,975 B2
(45) Date of Patent: Aug. 2, 2016

(54) THERMOPLASTIC POLYMER COMPOSITION, PRODUCTION METHOD THEREOF, AND SHAPED ARTICLE AND ELECTRIC CABLE OBTAINED THEREFROM

(75) Inventors: Hiroshi Uehara, Chiba (JP); Mariko Harigaya, Utsunomiya (JP); Masayoshi Yamaguchi, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 1045 days.

(21) Appl. No.: 11/729,950

(22) Filed: Mar. 30, 2007

(65) Prior Publication Data

US 2008/0023215 A1     Jan. 31, 2008

(30) Foreign Application Priority Data

Mar. 31, 2006 (JP) ................. 2006-096475
Nov. 16, 2006 (JP) ................. 2006-309766

(51) Int. Cl.
| | |
|---|---|
| H01B 17/00 | (2006.01) |
| C08L 51/00 | (2006.01) |
| C08K 3/22 | (2006.01) |
| C08L 51/06 | (2006.01) |
| C08F 255/02 | (2006.01) |
| C08L 23/10 | (2006.01) |
| H01B 3/44 | (2006.01) |

(52) U.S. Cl.
CPC ............. *C08L 51/06* (2013.01); *C08F 255/02* (2013.01); *C08L 23/10* (2013.01); *H01B 3/441* (2013.01); *C08L 2205/02* (2013.01)

(58) Field of Classification Search
CPC .... C08F 255/00; C08F 261/00; C08F 290/04; C08K 3/34
USPC .............. 525/70, 71, 74, 78, 80, 86; 524/434, 524/436
See application file for complete search history.

(56) References Cited

U.S. PATENT DOCUMENTS

| | | | | |
|---|---|---|---|---|
| 4,675,210 A | * | 6/1987 | Clayton | ................ C08F 255/02 156/244.11 |
| 6,316,512 B1 | * | 11/2001 | Bambara et al. | ............... 521/144 |
| 6,462,121 B2 | | 10/2002 | Sato et al. | |
| 7,488,789 B2 | | 2/2009 | Ikenaga et al. | |
| 2003/0004245 A1 | * | 1/2003 | Scheibelhoffer et al. | ............. 524/425 |

FOREIGN PATENT DOCUMENTS

| | | |
|---|---|---|
| CN | 85102222 | 8/1988 |
| EP | 1 213 322 A1 | 6/2002 |
| EP | 1 221 462 A1 | 7/2002 |
| EP | 1 602 686 A1 | 12/2005 |
| JP | 48007992 A * | 6/1971 |
| JP | 58047002 A * | 3/1983 |
| JP | 05-239281 | 9/1993 |
| JP | 11-236421 | 8/1999 |
| JP | 2002-167480 A | 6/2002 |
| JP | 2002-309048 | 10/2002 |
| JP | 2002-364783 | 12/2002 |
| JP | 2003-313377 | 11/2003 |
| WO | WO 9606872 A1 * | 3/1996 |
| WO | WO-2004/087775 A1 | 10/2004 |
| WO | WO-2005/118706 A1 | 12/2005 |
| WO | WO 2006/057361 A1 | 6/2006 |
| WO | WO 2007008765 A2 * | 1/2007 |

OTHER PUBLICATIONS

Office Action in CN 200780010843.8 dated Aug. 25, 2010.
Communication (Supplementary EP Search Report) in EP Appln No. 07 73 9739 dated Mar. 8, 2011.
Korean Office Action mailed Apr. 26, 2010 in Korean Application No. 10-2008-7026654.

* cited by examiner

*Primary Examiner* — Jennifer Chriss
*Assistant Examiner* — Ricardo E Lopez
(74) *Attorney, Agent, or Firm* — Foley & Lardner LLP

(57) ABSTRACT

Propylene-based resin compositions contain an inorganic filler in a high ratio and are excellent in flexibility, mechanical strength, elongation at break, heat resistance, scratch resistance, whitening resistance and flame retardancy. Shaped articles comprise the compositions.

A first propylene-based resin composition of the present invention contains 5 to 64.9% by weight of a propylene-based polymer (A) having a melting point, as measured by differential scanning calorimetry (DSC), in the range of 120° C. to 170° C.; 0 to 59.9% by weight of a propylene-based polymer (B) having a melting point, as measured by differential scanning calorimetry (DSC), of less than 120° C. or having no observed melting point; 0.1 to 30% by weight of a graft-modified propylene-based polymer (C) obtained by graft modifying a propylene-based polymer having a melting point, as measured by differential scanning calorimetry (DSC), of less than 120° C. or having no observed melting point; and 35 to 75% by weight of an inorganic filler (D) (here, the total amount of (A), (B), (C) and (D) is 100% by weight).

23 Claims, No Drawings

THERMOPLASTIC POLYMER COMPOSITION, PRODUCTION METHOD THEREOF, AND SHAPED ARTICLE AND ELECTRIC CABLE OBTAINED THEREFROM

BACKGROUND OF THE INVENTION

1. Field of the Invention

The present invention relates to a thermoplastic polymer composition and a shaped article obtained from the composition. More particularly, the present invention relates to a thermoplastic polymer composition which contains an inorganic filler in a high ratio and is excellent in flexibility, mechanical strength, elongation at break, heat resistance, scratch resistance, whitening resistance and flame retardancy, and further to a shaped article obtained by using the thermoplastic polymer composition.

2. Description of the Related Art

Sheath materials and some insulating materials for electric cables are frequently polyvinyl chloride and crosslinked polyethylene, and their flexibility, flame retardancy and insulation property are appreciated. However, there are difficulties in their disposition or recycling because of the generation of chlorine gases by heating and the lack of thermoplasticity. For this reason, there has been known a shaped article comprising a crystalline homopolymer or copolymer of polyethylene which is non-crosslinked and is recyclable and has mechanical and electrical properties fit for usual use conditions as disclosed in Patent Document 1. The shaped article used in Patent Document 1 is excellent in flexibility, impact resistance and low-temperature property, but is insufficient in scratch resistance and tensile strength. Patent Document 1: Japanese Patent Laid-Open Publication No. H11-111061

SUMMARY OF THE INVENTION

An object of the present invention is to provide a thermoplastic polymer composition which contains an inorganic filler in a high ratio and is excellent in flexibility, mechanical strength, elongation at break, heat resistance, scratch resistance, whitening resistance and flame retardancy. It is another object of the present invention that flexibility and heat resistance are ensured without significantly reducing the brittle temperature and the scratch resistance is improved by increasing hardness. In other words, an object of the present invention is to provide a method of producing a thermoplastic polymer composition which is excellent in flexibility, mechanical strength, elongation at break, heat resistance, whitening resistance and flame retardancy and is especially excellent in scratch resistance. In addition, an object of the present invention is to provide a shaped article comprising the composition, and an electric cable having an insulation material and/or sheath comprising the composition.

[First Thermoplastic Polymer Composition]

A first thermoplastic polymer composition related to the present invention comprises the following (A), (B), (C) and (D):

(A) 5 to 64.9% by weight of a propylene-based polymer having a melting point, as measured by differential scanning calorimetry (DSC), in the range of 120° C. to 170° C.;

(B) 0 to 59.9% by weight of a propylene-based polymer having a melting point, as measured by differential scanning calorimetry (DSC), of less than 120° C. or having no observed melting point;

(C) 0.1 to 30% by weight of a graft-modified propylene-based polymer obtained by graft modifying a propylene-based polymer (C-1) having a melting point as measured by differential scanning calorimetry (DSC) of less than 120° C. or having no observed melting point with at least one compound selected from the group consisting of a vinyl compound containing a polar group and a silane compound; and (D) 35 to 75% by weight of an inorganic filler.

Here, the total amount of (A), (B), (C) and (D) is 100% by weight.

The inorganic filler (D) is preferably one or more kinds selected from the group consisting of talc, metal hydroxides, metal carbonates and metal oxides.

The first thermoplastic polymer composition of the present invention preferably contains 0.1 to 20 parts by weight of an oil (F) relative to the total 100 parts by weight of the propylene-based polymer (A), the propylene-based polymer (B), the graft-modified propylene-based polymer (C) and the inorganic filler (D). Further, the thermoplastic polymer composition of the present invention preferably contains 0.1 to 20 parts by weight of an ethylene-based polymer (E) relative to the total 100 parts by weight of the propylene-based polymer (A), the propylene-based polymer (B), the graft-modified propylene-based polymer (C) and the inorganic filler (D).

A method of producing the thermoplastic polymer composition containing the ethylene-based polymer (E) comprises melt-kneading the graft-modified propylene-based polymer (C) with the ethylene-based polymer (E) to produce a propylene-based polymer composition (G), and melt-kneading the propylene-based polymer composition (G) with components including the inorganic filler (D), the propylene-based polymer (A) and optionally the propylene-based polymer (B).

A first shaped article is preferably an insulating material for an electric cable or an electric cable sheath.

A first electric cable of the present invention has an insulating material comprising the thermoplastic polymer composition and/or a sheath comprising the thermoplastic polymer composition. The electric cable is preferably an electric cable for an automobile or an electric cable for an instrument.

[Second Thermoplastic Polymer Composition]

A second thermoplastic polymer composition related to the present invention comprises the following (A), (BB) and (D):

(A) 5 to 64.9% by weight of a propylene-based polymer having a melting point, as measured by differential scanning calorimetry (DSC), in the range of 120° C. to 170° C.;

(BB) 0.1 to 60.0% by weight of a modified propylene-based polymer which is partly or fully graft-modified with at least one compound selected from the group consisting of a vinyl compound containing a polar group and a silane compound, and which has a melting point, as measured by differential scanning calorimetry (DSC), of less than 120° C. or has no observed melting point; and (D) 35 to 75% by weight of an inorganic filler.

Here, the total amount of (A), (BB) and (D) is 100% by weight.

The inorganic filler (D) is preferably one or more kinds selected from the group consisting of talc, metal hydroxides, metal carbonates and metal oxides.

The second thermoplastic polymer composition of the present invention preferably contains 0.1 to 20 parts by weight of an ethylene-based polymer (E) relative to the total 100 parts by weight of the propylene-based polymer (A), the graft-modified propylene-based polymer (BB) and the inorganic filler (D). Further, the second thermoplastic polymer composition of the present invention preferably contains 0.1 to 20 parts by weight of an oil (F) relative to the total 100 parts by weight of the propylene-based polymer (A), the graft-modified propylene-based polymer (BB) and the inorganic filler (D).

Furthermore, a method of producing the second thermoplastic polymer composition containing the ethylene-based polymer (E) comprises melt-kneading the graft-modified propylene-based polymer (BB) with the ethylene-based polymer (E) to produce a propylene-based polymer composition (GG), and melt-kneading the propylene-based polymer composition (GG) with components including the inorganic filler (D) and the propylene-based polymer (A).

A second shaped article of the present invention comprises the second thermoplastic polymer composition. The second shaped article is preferably an insulation material for an electric cable or an electric cable sheath.

A second electric cable of the present invention has an insulating material comprising the second thermoplastic polymer composition and/or a sheath comprising the second thermoplastic polymer composition.

The second electric cable is preferably an electric cable for an automobile or an electric cable for an instrument.

DESCRIPTION OF THE PREFERRED EMBODIMENTS

The first and second thermoplastic polymer compositions of the present invention contain the inorganic filler in a high ratio and have good flexibility as well as excellent mechanical strength, elongation at break, whitening resistance and scratch resistance.

In the case where the oil is contained in the first and second thermoplastic polymer compositions of the present invention, the compositions are excellent especially in scratch resistance and low temperature brittleness resistance. In addition, in the case where the ethylene-based polymer is contained in the thermoplastic polymer compositions of the present invention, the compositions are excellent especially in scratch resistance. Further, according to the methods of producing the first and second thermoplastic polymer compositions of the present invention, there may be obtained thermoplastic polymer compositions which are excellent in flexibility, mechanical strength, elongation at break and flame retardancy as well as in scratch resistance.

Since the first and second thermoplastic polymer compositions of the present invention contain the inorganic filler in a high ratio, they are suited for producing shaped articles excellent in flame retardancy, especially electric cables.

Hereinafter, the present invention will be explained in detail.

[First Thermoplastic Polymer Composition]
<Propylene-Based Polymer (A)>

As the propylene-based polymer (A) used in the present invention, there may be mentioned a propylene homopolymer or a copolymer of propylene with at least one olefin selected from ethylene and α-olefins having 4 to 20 carbon atoms. Here, as ethylene and the α-olefins having 4 to 20 carbon atoms, there may be mentioned ethylene, 1-butene, 1-pentene, 1-hexene, 4-methyl-1-pentene, 1-octene, 1-decene, 1-dodecene, 1-tetradecene, 1-hexadecene, 1-octadecene and 1-eicosene, and preferable are ethylene and the α-olefins having 4 to 10 carbon atoms. These α-olefins may form a random copolymer or a block copolymer with propylene.

The constituent units derived from ethylene and the α-olefins having 4 to 20 carbon atoms may be contained in an amount of 35 mol % or less, preferably 30 mol % or less in the whole constituent units of the propylene-based polymer (A).

The propylene-based polymer (A) usually has a melt flow rate (temperature: 230° C., load: 2.16 kg) of 0.01 to 1000 g/10 min, preferably 0.05 to 100 g/10 min, more preferably 0.1 to 50 g/10 min and further more preferably 0.1 to 10 g/10 min, as measured according to ASTM D1238.

The propylene-based polymer (A) used in the present invention has a melting point as measured by differential scanning calorimetry (DSC) of 120° C. or higher, preferably from 120 to 170° C. and more preferably from 125 to 165° C. The measurement of the melting point (Tm) is carried out as follows. That is, the melting point is a peak temperature in an endothermic curve observed when a sample in an aluminum pan is heated to 200° C. at an elevation rate of 100° C./min and maintained at 200° C. for 5 minutes and then cooled to −150° C. at a cooling rate of 10° C./min and subsequently heated again to 200° C. at an elevation rate of 10° C./min.

The propylene-based polymer (A) may have an isotactic structure or a syndiotactic structure, but preferably has an isotactic structure in terms of heat resistance and the like.

Further, a plurality of propylene-based polymers (A) may be used simultaneously if needed. For example, two or more components which are different in melting point and rigidity may be used.

Depending on desired physical properties, the propylene-based polymer (A) may be selected from the group consisting of a homopolypropylene excellent in heat resistance (in which a comonomer other than propylene typically accounts for 3 mol % or less), a block polypropylene excellent in balance between heat resistance and impact resistance (which typically has 3 to 30% by weight of a n-decane-soluble rubber component), and a random polypropylene excellent in balance between flexibility and transparency (which typically has a melting peak of 120° C. or higher and preferably in the range of 125° C. to 150° C., as measured by differential scanning calorimetry (DSC)). These polypropylenes may be simultaneously used.

Such propylene-based polymer (A) may be produced by polymerizing propylene or copolymerizing propylene with ethylene and the α-olefin(s) by using a solid catalyst component containing magnesium, titanium, halogen and an electron donor as essential components; a Ziegler catalyst system comprising an organoaluminum compound and an electron donor; or a metallocene catalyst system containing a metallocene compound as one component of the catalyst.

<Propylene-Based Polymer (B)>

The propylene-based polymer (B) optionally used in the present invention is a copolymer of propylene with at least one olefin selected from ethylene and α-olefins having 4 to 20 carbon atoms. The polymer typically contains 40 to 99 mol %, preferably 40 to 92 mol % and more preferably 50 to 90 mol % of constituent units derived from propylene, and 1 to 60 mol %, preferably 8 to 60 mol % and more preferably 10 to 50 mol % of constituent units derived from ethylene and the α-olefins having 4 to 20 carbon atoms (here, the total of propylene, ethylene and the α-olefins having 4 to 20 carbon atoms is 100 mol %).

The propylene-based polymer (B) used in the present invention is preferably a copolymer of propylene with at least one olefin selected from ethylene and α-olefins having 4 to 20 carbon atoms. As ethylene and the α-olefins having 4 to 20 carbon atoms, there may be mentioned specifically ethylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-pentene, 4-ethyl-1-hexene, 1-octene, 3-ethyl-1-hexene, 1-octene, and 1-decene. These may be used alone or in combination of two or more kinds. Of these, especially preferably used is at least one of ethylene, 1-butene, 1-hexene and 1-octene.

The propylene-based polymer (B) used in the present invention usually has a melt flow rate (temperature: 230° C.

and load: 2.16 kg) of 0.1 to 50 (g/10 min). In addition, the propylene-based polymer (B) has a melting point as measured by differential scanning calorimetry (DSC) of less than 120° C. or has no observed melting point, and preferably has a melting point of 100° C. or lower or has no observed melting point. Here, that a melting point is not observed means that a crystal fusion peak with a heat of crystal fusion of 1 J/g or higher is not observed in the range of −150 to 200° C. The measurement conditions are described in Examples.

A method of producing the propylene-based polymer (B) is not particularly limited. For example, the propylene-based polymer (B) may be produced by a method described in WO 04/87775.

As the specific examples of the propylene-based polymer (B) having the characteristics as mentioned above, there may be mentioned a random copolymer (B-1) of propylene and the α-olefin having 4 to 20 carbon atoms and a random copolymer (B-2) of propylene, ethylene and the α-olefin having 4 to 20 carbon atoms.

By using the random copolymer (B-1) of propylene and the α-olefin having 4 to 20 carbon atoms, the obtainable thermoplastic polymer composition shows excellent mechanical strength, elongation at break, scratch resistance and whitening resistance.

By using the random copolymer (B-2) of propylene, ethylene and the α-olefin having 4 to 20 carbon atoms, the obtainable thermoplastic polymer composition shows excellent flexibility, scratch resistance and whitening resistance.

Hereinafter, there will be explained the random copolymer (B-1) of propylene and the α-olefin having 4 to 20 carbon atoms, and the random copolymer (B-2) of propylene, ethylene and the α-olefin having 4 to 20 carbon atoms.

[Random Copolymer (B-1) of Propylene and α-Olefin Having 4 to 20 Carbon Atoms]

The random copolymer (B-1) of propylene and the α-olefin having 4 to 20 carbon atoms preferably used in the present invention contains constituent units derived from propylene, constituent units derived from ethylene, and constituent units derived from the α-olefin having 4 to 20 carbon atoms, and satisfies the following (a) and (b).

(a) The molecular weight distribution (Mw/Mn) as measured by gel permeation chromatography (GPC) is in the range of 1 to 3.

(b) The melting point (Tm) (° C.) and the content M (mol %) of constituent units derived from the comonomer as determined by $^{13}$C-NMR spectrum satisfy the following relation (1). The melting point Tm is less than 120° C. and preferably less than 100° C. The value M is not particularly limited but, for example, may be from 5 to 45.

$$146\exp(-0.022M) \geq Tm \geq 125\exp(-0.032M) \quad (1)$$

The melting point (Tm) of the random copolymer (B-1) of propylene with the α-olefin having 4 to 20 carbon atoms is measured by DSC as follows. The measurement is carried out by filling an aluminum pan with a sample, (i) heating the sample to 200° C. at an elevation rate of 100° C./min and maintaining the sample at 200° C. for 5 minutes, (ii) cooling the sample to −150° C. at a cooling rate of 10° C./min and subsequently (iii) heating the sample to 200° C. at an elevation rate of 10° C./min. The temperature of an endothermic peak observed at the stage (iii) is the melting point (Tm). The melting point (Tm) is typically less than 120° C., preferably 100° C. or lower, more preferably in the range of 40 to 95° C. and further more preferably in the range of 50 to 90° C. If the melting point (Tm) is within this range, the obtainable shaped article shows excellent balance between flexibility and strength, and also shows reduced surface stickiness to permit easy processing.

The random copolymer (B-1) of propylene with the α-olefin having 4 to 20 carbon atoms desirably satisfies:

(c) the degree of crystallinity measured by X-ray diffraction is preferably 40% or less and more preferably 35% or less.

In the random copolymer (B-1) of propylene with the α-olefin having 4 to 20 carbon atoms, the content of constituent units derived from the α-olefin having 4 to 20 carbon atoms is preferably 5 to 50 mol % and more preferably 10 to 35 mol %. As the α-olefin having 4 to 20 carbon atoms, 1-butene is preferably used.

Such random copolymer (B-1) of propylene with the α-olefin having 4 to 20 carbon atoms may be obtained by a method described in WO 04/87775.

[Random Copolymer (B-2) of Propylene, Ethylene and α-olefin Having 4 to 20 Carbon Atoms]

The random copolymer (B-2) of propylene, ethylene and the α-olefin having 4 to 20 carbon atoms preferably used in the present invention contains constituent units derived from propylene, constituent units derived from ethylene and constituent units derived from the α-olefin having 4 to 20 carbon atoms, and satisfies the following (m) and (n).

(m) The molecular weight distribution (Mw/Mn) as measured by gel permeation chromatography (GPC) is in the range of 1 to 3.

(n) The random copolymer (B-2) contains 40 to 85 mol % of constituent units derived from propylene, 5 to 30 mol % of constituent units derived from ethylene and 5 to 30 mol % of constituent units derived from the α-olefin having 4 to 20 carbon atoms (here, the total of constituent units derived from propylene, constituent units derived from ethylene and constituent units derived from the α-olefin having 4 to 20 carbon atoms is 100 mol %. Further, the total of constituent units derived from ethylene and constituent units derived from the α-olefin having 4 to 20 carbon atoms is preferably 60 to 15 mol %).

Further, the random copolymer (B-2) of propylene, ethylene and the α-olefin having 4 to 20 carbon atoms preferably satisfies at least one, more preferably both of the following (o) and (p).

(o) The Shore A hardness is 30 to 80 and preferably 35 to 60.

(p) The degree of crystallinity measured by X-ray diffraction is 20% or less and preferably 10% or less.

In addition, the melting point (Tm) of the random copolymer (B-2) of propylene, ethylene and the α-olefin having 4 to 20 carbon atoms measured by DSC is preferably 50° C. or lower or is preferably not observed. The measurement of the melting point may be carried out by the same method as that of the copolymer (B-1).

As regards the amounts of the propylene component and other comonomer components, more particularly, the random copolymer (B-2) preferably contains 60 to 82 mol % and more preferably 61 to 75 mol % of constituent units derived from propylene; 8.0 to 15 mol % and more preferably 10 to 14 mol % of constituent units derived from ethylene; and 10 to 25 mol % and more preferably 15 to 25 mol % of constituent units derived from the α-olefin having 4 to 20 carbon atoms. As the α-olefin having 4 to 20 carbon atoms, 1-butene is especially preferably used.

Such random copolymer (B-2) of propylene, ethylene and the α-olefin having 4 to 20 carbon atoms may be obtained, for example, by a method described in WO 04/87775.

By using the random copolymer (B-2) of propylene, ethylene and the α-olefin having 4 to 20 carbon atoms in the present invention, the obtainable shaped article has improved flexibility and excellent low temperature brittleness resistance. The shaped article, for example electric cable, has an advantage that the coating of the electric cable is unlikely to be broken even when exposed to a low temperature.

<Graft-Modified Propylene-Based Polymer (C)>

As the polymer used as a raw material of the graft-modified propylene-based polymer (C), a propylene-based polymer (C-1) having a melting point as measured by differential scanning calorimetry (DSC) of less than 120° C. or having no observed melting point is preferable in terms of improvement in tensile elongation at break and abrasion resistance.

The propylene-based polymer (C-1) is a copolymer of propylene with at least one olefin selected from ethylene and α-olefins having 4 to 20 carbon atoms. The polymer usually contains 40 to 99 mol %, preferably 40 to 92 mol % and more preferably 50 to 90 mol % of constituent units derived from propylene; and 1 to 60 mol %, preferably 8 to 60 mol % and more preferably 10 to 50 mol % of constituent units derived from ethylene and the α-olefins having 4 to 20 carbon atoms used as comonomers (here, the total of propylene, ethylene and the α-olefins having 4 to 20 carbon atoms is 100 mol %).

The propylene-based polymer (C-1) used in the present invention is preferably a copolymer of propylene with at least one olefin selected from ethylene and α-olefins having 4 to 20 carbon atoms. As ethylene and the α-olefins having 4 to 20 carbon atoms, ethylene and the α-olefins described in the propylene-based polymer (B) may be used singly or in combination of two or more kinds. Of these, especially preferably used is at least one of ethylene, 1-butene, 1-hexene and 1-octene.

The propylene-based polymer (C-1) used in the present invention typically has a melt flow rate (temperature: 230° C., load: 2.16 kg) of 0.1 to 50 (g/10 min). In addition, the propylene-based polymer (C-1) has a melting point of less than 120° C. as measured by differential scanning calorimetry (DSC) or has no observed melting point, and preferably has a melting point of 100° C. or lower or has no observed melting point. Here, that a melting point is not observed means that a crystal fusion peak with a heat of crystal fusion of 1 J/g or higher is not observed in the range of −150 to 200° C. The measurement conditions are as described in Examples.

A method of producing the propylene-based polymer (C-1) is not particularly limited. For example, the propylene-based polymer (C-1) may be produced by a method described in WO 04/087775.

As specific examples of the propylene-based polymer (C-1) having the characteristics as mentioned above, there may be mentioned a random copolymer (C-1a) of propylene with the α-olefin having 4 to 20 carbon atoms, and a random copolymer (C-1b) of propylene, ethylene and the α-olefin having 4 to 20 carbon atoms.

[Random Copolymer (C-1a) of Propylene with α-Olefin Having 4 to 20 Carbon Atoms]

The random copolymer (C-1a) of propylene with the α-olefin having 4 to 20 carbon atoms preferably used in the present invention contains constituent units derived from propylene and constituent units derived from the α-olefin having 4 to 20 carbon atoms, and satisfies the following (a1) and (b1).

(a1) The molecular weight distribution (Mw/Mn) as measured by gel permeation chromatography (GPC) is in the range of 1 to 3.

(b1) The melting point (Tm)(° C.) and the content M (mol %) of constituent units derived from the comonomer as determined by $^{13}$C-NMR spectrum satisfy the following relation (1). The melting point Tm is less than 120° C. and preferably less than 100° C.

$$146\exp(-0.022M) \geq Tm \geq 125\exp(-0.032M) \tag{1}$$

The random copolymer (C-1a) of propylene with the α-olefin having 4 to 20 carbon atoms usually has a melting point (Tm) of less than 120° C., preferably 100° C. or lower, more preferably in the range of 40 to 95° C. and further more preferably in the range of 50 to 90° C. If the melting point (Tm) is within this range, the obtainable shaped article shows particularly excellent balance between flexibility and strength, and also shows reduced surface stickiness to permit easy processing. As the measurement method of the melting point (Tm) of the random copolymer (C-1a) of propylene with the α-olefin having 4 to 20 carbon atoms, there may be mentioned the same method as described in the random copolymer (B-1) of propylene with the α-olefin having 4 to 20 carbon atoms.

The random copolymer (C-1a) of propylene with the α-olefin having 4 to 20 carbon atoms preferably satisfies the following (c1):

(c1) the degree of crystallinity measured by X-ray diffraction is preferably 40% or less and more preferably 35% or less.

In the random copolymer (C-1a) of propylene and the α-olefin having 4 to 20 carbon atoms, the content of constituent units derived from the α-olefin having 4 to 20 carbon atoms is preferably 5 to 50 mol % and more preferably 10 to 35 mol %. As the α-olefin having 4 to 20 carbon atoms, 1-butene is preferably used.

Such random copolymer (C-1a) of propylene with the α-olefin having 4 to 20 carbon atoms may be obtained, for example, by a method described in WO 04/87775.

By use of a modified product of the random copolymer (C-1a) of propylene with the α-olefin having 4 to 20 carbon atoms, the obtainable thermoplastic polymer composition shows excellent mechanical strength, elongation at break, scratch resistance, whitening resistance and low temperature brittleness resistance. In addition, such thermoplastic polymer composition can give a shaped article, for example an electric cable, which has an advantage that the coating of the electric cable is unlikely to be broken even when exposed to a low temperature.

[Random Copolymer (C-1b) of Propylene, Ethylene and α-Olefin Having 4 to 20 Carbon Atoms]

The random copolymer (C-1b) of propylene, ethylene and the α-olefin having 4 to 20 carbon atoms preferably used in the present invention contains constituent units derived from propylene, constituent units derived from ethylene and constituent units derived from the α-olefin having 4 to 20 carbon atoms, and satisfies the following (m1) and (n1).

(m1) The molecular weight distribution (Mw/Mn) as measured by gel permeation chromatography (GPC) is in the range of 1 to 3.

(n1) The random copolymer (C-1b) contains 40 to 85 mol % of constituent units derived from propylene, 5 to 30 mol % of constituent units derived from ethylene and 5 to 30 mol % of constituent units derived from the α-olefin having 4 to 20 carbon atoms (here, the total of constituent units derived from propylene, constituent units derived from ethylene and constituent units derived from the α-olefin having 4 to 20 carbon atoms is 100 mol %. Further, the total of constituent units derived from ethylene and constituent units derived from the α-olefin having 4 to 20 carbon atoms is preferably 60 to 15 mol %).

Further, the random copolymer (C-1b) of propylene, ethylene and the α-olefin having 4 to 20 carbon atoms preferably satisfies at least one, more preferably both of the following (o1) and (p1).

(o1) The Shore A hardness is 30 to 80 and preferably 35 to 60.

(p1) The degree of crystallinity measured by X-ray diffraction is 20% or less and preferably 10% or less.

In addition, the melting point (Tm) of the random copolymer (C-1b) of propylene, ethylene and the α-olefin having 4 to 20 carbon atoms measured by DSC is preferably 50° C. or less or is preferably not observed. The measurement of the melting point may be carried out by the same method as that of the copolymer (B-1).

As regards the amounts of the propylene component and other comonomer components, more particularly, the random copolymer (C-1b) preferably contains 60 to 82 mol % and more preferably 61 to 75 mol % of constituent units derived from propylene; 8.0 to 15 mol % and more preferably 10 to 14 mol % of constituent units derived from ethylene; and 10 to 25 mol % and more preferably 15 to 25 mol % of constituent units derived from the α-olefin having 4 to 20 carbon atoms. As the α-olefin having 4 to 20 carbon atoms, 1-butene is especially preferably used.

Such random copolymer (C-1b) of propylene, ethylene and the α-olefin having 4 to 20 carbon atoms may be obtained, for example, by a method described in WO 04/87775.

Further, by use of a modified product of the random copolymer (C-1b) of propylene, ethylene and the α-olefin having 4 to 20 carbon atoms, the obtainable thermoplastic polymer composition is excellent in flexibility, scratch resistance, whitening resistance and low temperature brittleness resistance. In addition, the thermoplastic polymer composition can give a shaped article, for example electric cable, which has an advantage that the coating of the electric cable is unlikely to be broken even when exposed to a low temperature.

Meanwhile, when the propylene-based polymer (B) is used, the propylene-based polymer (B) and the propylene-based polymer (C-1) which is a raw material before modification may be the same or different from each other.

The graft-modified propylene-based polymer (C) used in the present invention may be obtained by graft modifying the propylene-based polymer (C-1) having a melting point as measured by differential scanning calorimetry (DSC) of less than 120° C. or having no observed melting point, with at least one compound selected from the group consisting of a vinyl compound containing a polar group and a silane compound. Examples of the vinyl compounds include vinyl compounds having an oxygen-containing group such as acid, acid anhydride, ester, alcohol, epoxy and ether; and vinyl compounds having a nitrogen-containing group such as isocyanate and amide. Examples of the silane compounds include vinylsilane, aminosilane and γ-methacryloxypropyltrimethoxysilane. Of these, preferable are the vinyl compounds having an oxygen-containing group, specifically unsaturated epoxy monomers, unsaturated carboxylic acids and derivatives thereof.

The unsaturated epoxy monomers include an unsaturated glycidyl ether and an unsaturated glycidyl ester (for example, glycidyl methacrylate).

The unsaturated carboxylic acids include acrylic acid, maleic acid, fumaric acid, tetrahydrophthalic acid, itaconic acid, citraconic acid, crotonic acid, isocrotonic acid, and Nadic Acid™ (endocis-bicyclo[2.2.1]hepto-5-ene-2,3-dicarboxylic acid).

Further, as the derivatives of the unsaturated carboxylic acids, there may be mentioned acid halide compounds, amide compounds, imide compounds, acid anhydrides and ester compounds of the unsaturated carboxylic acids, and specifically there may be mentioned malenyl chloride, maleimide, anhydrous maleic acid, anhydrous citraconic acid, monomethyl maleate, dimethyl maleate, and glycidyl maleate.

Of these, preferable are the unsaturated dicarboxylic acids and acid anhydrides thereof, and especially preferably used are maleic acid, Nadic Acid™ and acid anhydrides thereof.

The graft position of the unsaturated carboxylic acid or its derivative grafted on the unmodified propylene-based copolymer is not particularly limited. The unsaturated carboxylic acid or its derivative may be bonded to an arbitrary carbon atom of the ethylene-based polymer.

The graft-modified propylene-based polymer (C) as mentioned above may be prepared by various conventionally known methods, for example, by using the following methods.

(1) The unmodified polymer is melted by an extruder or the like. The unsaturated carboxylic acid or the like is added and grafted to the polymer.

(2) The unmodified polymer is dissolved in a solvent. The unsaturated carboxylic acid or the like is added and grafted to the polymer.

In either case, in order to effectively graft copolymerize the graft monomer such as the unsaturated carboxylic acid, the graft reaction is preferably carried out in the presence of a radical initiator. As the radical initiator, for example, preferably used are an organic peroxide, an azo compound and the like.

As the organic peroxide, there may be mentioned benzoyl peroxide, dichlorobenzoyl peroxide and dicumyl peroxide. As the azo compound, there may be mentioned azobisisobutyl nitrile and dimethyl azoisobutyrate.

As such radical initiator, specifically, preferably used is a dialkyl peroxide such as dicumyl peroxide, di-tert-butyl peroxide, 2,5-dimethyl-2,5-di(tert-butylperoxy)-3-hexyne, 2,5-dimethyl-2,5-di(tert-butylperoxy)hexane, and 1,4-bis(tert-butylperoxyisopropyl)benzene.

These radical initiators are typically used in an amount of 0.001 to 1 parts by weight, preferably 0.003 to 0.5 parts by weight and more preferably 0.05 to 0.3 parts by weight, relative to 100 parts by weight of the unmodified polymer.

The reaction temperature of the graft reaction using or without using the radical initiator as mentioned above is typically in the range of 60 to 350° C. and preferably 150 to 300° C.

The graft amount of the vinyl compound having a polar group in the graft-modified propylene-based polymer (C) thus obtained is not particularly limited, but is typically 0.01 to 10% by weight and preferably 0.05 to 5% by weight, provided that the mass of the graft-modified polymer is 100% by weight. In the present invention, by use of the graft-modified polymer (C) as mentioned above, the obtainable shaped article is especially excellent in the balance between tensile strength and scratch resistance.

<Inorganic Filler (D)>

The inorganic filler (D) used in the present invention is not particularly limited. For example, metal compounds and inorganic compounds such as glass, ceramic, talc and mica may be widely used. Among these, preferably used are talc, metal hydroxides, metal carbonates (carbonates) and metal oxides. In the present invention, the inorganic fillers (D) may be used alone or in combination of two or more kinds. As the metal hydroxides used in the present invention, there may be mentioned aluminum hydroxide, magnesium hydroxide, calcium hydroxide, barium hydroxide, manganese hydroxide, zinc hydroxide, hydrotalcite, and mixtures thereof. In particular, magnesium hydroxide alone or a mixture containing magnesium hydroxide is preferable.

The average particle size of the inorganic filler (D) is not particularly limited but is typically 0.1 to 20 μm and preferably 0.5 to 15 μm. Here, the average particle size is a value determined by a laser method.

In addition, the inorganic filler (D) used in the present invention may be surface treated with a fatty acid such as stearic acid or oleic acid, an organosilane or the like. The inorganic filler may be an aggregate of fine particles having the above average particle size.

<Ethylene-Based Polymer (E)>

The ethylene-based polymer is an ethylene-based elastomer having at least 61 mol % of constituent units derived from ethylene relative to the total constituent units. As the ethylene-based polymer, especially preferable are an ethylene homopolymer and ethylene/α-olefin copolymers comprising constituent units derived from ethylene and constituent units derived from an α-olefin. Among the ethylene/α-olefin copolymers, preferable is a copolymer (E-1) of ethylene with an α-olefin having 3 to 10 carbon atoms. As the α-olefins having 3 to 10 carbon atoms, there may be specifically mentioned propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-pentene, 4-ethyl-1-hexene, 1-octene, 3-ethyl-1-hexene, 1-octene, and 1-decene. These may be used alone or in combination of two or more kinds. Among these, it is especially preferable to use at least one of propylene, 1-butene, 1-hexene and 1-octene.

As regards the content of each constituent unit in the ethylene-based copolymer, the content of constituent units derived from ethylene is preferably 75 to 95 mol % and the content of constituent units derived from at least one olefin selected from the α-olefins having 3 to 10 carbon atoms is preferably 5 to 25 mol %.

The ethylene/α-olefin copolymer has:

(i) a density of 0.855 to 0.910 g/cm$^3$ and preferably 0.857 to 0.890 g/cm$^3$;

(ii) a melt flow rate (temperature: 190° C., load: 2.16 kg) of 0.1 to 100 g/10 min and preferably 0.1 to 20 g/10 min; and (iii) an index of the molecular weight distribution (Mw/Mn) as evaluated by GPC of 1.5 to 3.5, preferably 1.5 to 3.0, and more preferably 1.8 to 2.5. The ethylene/α-olefin copolymer may be a graft-modified ethylene-based polymer (E-1) grafted with a vinyl compound having a polar group.

In that case, the vinyl compound having a polar group is as described with respect to the graft-modified propylene-based polymer (C). Further, the graft amount of the vinyl compound having a polar group in the graft-modified ethylene-based polymer (E-1) is not particularly limited but is typically 0.01 to 10% by weight and preferably 0.05 to 5% by weight provided that the mass of the graft-modified polymer is 100% by weight.

<Oil (F)>

Examples of the oils (F) used in the present invention include various oils such as paraffin oil, naphthenic oil, aromatic oil and silicon oil. Among these, preferably used are paraffin oil and naphthenic oil.

The oil (F) is not particularly limited but typically has a kinematic viscosity at 40° C. of 20 to 800 cst (centistokes) and preferably 40 to 600 cst. In addition, the oil (F) typically has a fluidity of 0 to −40° C. and preferably 0 to −30° C., and has a flash point (COC method) of 200 to 400° C. and preferably 250 to 350° C. By use of the oil (F), the obtainable thermoplastic polymer composition of the present invention shows excellent low temperature characteristics such as low temperature brittleness resistance, and scratch resistance.

The naphthenic process oil suitably used in the present invention is a petroleum-based softening agent which is commonly used in rubber processing in order to obtain softening effect, component-dispersing effect, lubricating effect and improved low temperature characteristics, and contains 30 to 45% by weight of a naphthenic hydrocarbon. If such process oil is added, the melt fluidity in shaping the resin composition and the flexibility and low temperature characteristics of the shaped article may be further improved, and the surface stickiness of the shaped article due to bleeding may be reduced. In the present invention, among naphthenic process oils, those having an aromatic hydrocarbon content of not more than 10% by weight are suitably used. If such oils are used, bleeding on the surface of the shaped article is unlikely to occur, although the reason is not clarified.

<First Thermoplastic Polymer Composition and Shaped Article>

The first thermoplastic polymer composition of the present invention contains 5.0 to 64.9% by weight of the propylene-based polymer (A), 0 to 59.9% by weight of the propylene-based polymer (B), 0.1 to 30% by weight of the graft-modified propylene-based polymer (C), and 35 to 75% by weight of the inorganic filler (D) (here, the total amount of (A), (B), (C) and (D) is 100% by weight).

When the propylene-based polymer (B) is used, the thermoplastic polymer composition preferably contains 5.0 to 64.9% by weight of the propylene-based polymer (A), 1.0 to 59.9% by weight of the propylene-based polymer (B), 0.1 to 29% by weight of the graft-modified propylene-based polymer (C), and 34 to 75% by weight of the inorganic filler (D) (here, the total amount of (A), (B), (C) and (D) is 100% by weight).

Further, the thermoplastic polymer composition may contain the ethylene-based polymer (E). For example, the copolymer (E-1) of ethylene with the α-olefin having 3 to 10 carbon atoms or the graft-modified ethylene-based polymer (E-2) may be used in an amount of 0.1 to 20 parts by weight relative to 100 parts by weight of the total amount of the components (A), (B), (C) and (D). If the amount of the ethylene-based polymer (E-1) is within this range, low temperature characteristics are significantly improved.

The oil (F) may be used in the present invention in an amount of 0.1 to 20 parts by weight relative to 100 parts by weight of the total amount of the components (A), (B), (C) and (D). If the amount of the oil (F) is within this range, low temperature characteristics are significantly improved and the oil is unlikely to bleed out on the surface of the shaped article.

The thermoplastic polymer composition of the present invention may contain additives as required while still achieving the objects of the invention. Examples of the additives include synthetic resins, rubbers, antioxidants, heat stabilizers, weather stabilizers, slip agents, antiblocking agents, nucleating agents, pigments, hydrochloric acid absorbers and copper inhibitors. The amounts of such synthetic resins, rubbers and additives are not particularly limited so long as the objects of the present invention are not impaired. In a preferred embodiment, the components (A), (B), (C) and (D) are contained so that the total of them is 60 to 100% by weight of the thermoplastic polymer composition. The balance is accounted for by the above-mentioned components such as synthetic resins, rubbers, additives, ethylene-based polymer (E), and oil (F).

[Second Thermoplastic Polymer Composition]

The second thermoplastic polymer composition of the present invention includes the following (A), (BB) and (D):

(A) 5 to 64.9% by weight of a propylene-based polymer having a melting point, as measured by differential scanning calorimetry (DSC), in the range of 120° C. to 170° C.;

(BB) 0.1 to 60.0% by weight of a modified propylene-based polymer which is partly or fully graft-modified with at least one compound selected from the group consisting of a vinyl compound containing a polar group and a silane compound, and which has a melting point, as measured by differential scanning calorimetry (DSC), of less than 120° C. or has no observed melting point; and (D) 35 to 75% by weight of an inorganic filler.

Here, the total amount of (A), (BB) and (D) is 100% by weight.

Here, the component (A) and preferred embodiments thereof are as described with respect to the first thermoplastic polymer composition.

<Graft-Modified Propylene-Based Polymer (BB)>

The graft-modified propylene-based polymer (BB) used in the present invention is preferably a partly or fully graft-modified copolymer of propylene with at least one olefin selected from ethylene and α-olefins having 4 to 20 carbon atoms. As the at least one olefin selected from ethylene and α-olefins having 4 to 20 carbon atoms, there may be specifically used ethylene and the α-olefins described in the propylene-based polymer (B), and they may be used alone or in combination of two or more kinds. Of these, especially preferably used is at least one of ethylene, 1-butene, 1-hexene and 1-octene.

The copolymer of propylene with ethylene and the α-olefin(s) having 4 to 20 carbon atoms typically contains 40 to 99 mol %, preferably 40 to 92 mol % and more preferably 50 to 90 mol % of constituent units derived from propylene, and 1 to 60 mol %, preferably 8 to 60 mol % and more preferably 10 to 50 mol % of constituent units derived from ethylene and the α-olefin(s) having 4 to 20 carbon atoms used as comonomer(s) (here, the total of propylene, ethylene and the α-olefin(s) having 4 to 20 carbon atoms is 100 mol %).

The graft-modified propylene-based polymer (BB) has a melting point as measured by differential scanning calorimetry (DSC) of less than 120° C. or has no observed melting point, and preferably has a melting point of 100° C. or lower or has no observed melting point. Here, that a melting point is not observed means that a crystal fusion peak with a heat of crystal fusion of 1 J/g or higher is not observed in the range of −150 to 200° C. The measurement conditions are as described in Examples.

The graft-modified propylene-based polymer (BB) usually has a melt flow rate of 0.01 to 100 g/10 min, preferably 0.1 to 50 g/10 min, more preferably 1 to 40 g/10 min, and especially preferably 5 to 30 g/10 min, as measured at 190° C. under a load of 2.16 kg.

Such graft-modified propylene-based polymer (BB) may be produced, for example, by graft-modifying the propylene-based polymer (C-1) described in the section of the first thermoplastic polymer composition with at least one compound selected from the group consisting of a vinyl compound containing a polar group and a silane compound. Alternatively, the graft-modified propylene-based polymer (BB) may be produced by blending a graft-modified product of the propylene-based polymer (C-1) with the propylene-based polymer (B) described in the section of the first thermoplastic polymer composition. In the production of the graft-modified propylene-based polymer (BB), the propylene-based polymer (C-1) described in the section of the first thermoplastic polymer composition, and the optional propylene-based polymer (B) each preferably have a triad tacticity (mm percentage) of 85% or higher, more preferably 85 to 97.5%, further more preferably 87 to 97% and especially preferably 90 to 97%, as measured according to $^{13}$C-NMR method. If the triad tacticity (mm percentage) is within this range, the polymer (BB) is excellent especially in balance between flexibility and mechanical strength. The mm percentage may be measured by the method described in page 21, line 7, to page 26, line 6, in WO 04/87775.

Preferably, the graft-modified propylene-based polymer (BB) is a graft-modified product (BB-1a) of a random copolymer of propylene with the α-olefin having 4 to 20 carbon atoms in which the content of constituent units derived from the α-olefin having 4 to 20 carbon atoms is in the range of 5 to 50 mol % (relative to 100 mol % of the total of constituent units derived from propylene and constituent units derived from the α-olefin having 4 to 20 carbon atoms).

In the graft-modified random copolymer (BB-1a) of propylene with the α-olefin having 4 to 20 carbon atoms, the degree of crystallinity measured by X-ray diffraction is preferably 40% or less and more preferably 35% or less.

In the graft-modified random copolymer (BB-1a) of propylene and the α-olefin having 4 to 20 carbon atoms, the content of constituent units derived from the α-olefin having 4 to 20 carbon atoms in the random copolymer of propylene with the α-olefin having 4 to 20 carbon atoms is preferably 5 to 50 mol % and more preferably 10 to 35 mol % (the total of constituent units derived from propylene and constituent units derived from the α-olefin having 4 to 20 carbon atoms is 100 mol %). Especially, 1-butene is preferably used as the α-olefin having 4 to 20 carbon atoms.

Such graft-modified random copolymer (BB-1a) of propylene with the α-olefin having 4 to 20 carbon atoms may be produced, for example, by graft-modifying the random copolymer (C-1a) of propylene and the α-olefin having 4 to 20 carbon atoms described in the section of the first thermoplastic polymer composition with at least one compound selected from the group consisting of a vinyl compound containing a polar group and a silane compound. Alternatively, the graft-modified random copolymer (BB-1a) may be produced by blending a graft-modified product of the random copolymer (C-1a) of propylene and the α-olefin having 4 to 20 carbon atoms with the random copolymer (B-1) of propylene and the α-olefin having 4 to 20 carbon atoms described in the section of the first thermoplastic polymer composition.

By use of the graft-modified random copolymer (BB-1a) of propylene and the α-olefin having 4 to 20 carbon atoms, the obtainable thermoplastic polymer composition is more excellent in mechanical strength, elongation at break, scratch resistance and whitening resistance, and also excellent in low temperature brittleness resistance. In addition, the thermoplastic polymer composition can give a shaped article, for example electric cable, which has an advantage that the coating of the electric cable is unlikely to be broken even when exposed to a low temperature.

Further, in the second thermoplastic polymer composition of the present invention, the graft-modified propylene-based polymer (BB) is preferably a graft-modified product (BB-1b) of a random copolymer of propylene, ethylene and the α-olefin having 4 to 20 carbon atoms which satisfies the following conditions:

The random copolymer contains 40 to 85 mol % of constituent units derived from propylene, 5 to 30 mol % of constituent units derived from ethylene, and 5 to 30 mol % of constituent units derived from the α-olefin having 4 to 20 carbon atoms (here, the total of constituent units derived from propylene, constituent units derived from butene and constituent units derived from the α-olefin having 4 to 20 carbon atoms is 100 mol %).

The graft-modified random copolymer (BB-1b) of propylene, ethylene and the α-olefin having 4 to 20 carbon atoms preferably satisfies at least one, more preferably both of the following (o1) and (p1).

(o1) The Shore A hardness is 30 to 80 and preferably 35 to 60.

(p1) The degree of crystallinity measured by X-ray diffraction is 20% or less and preferably 10% or less.

Preferably, the graft-modified random copolymer (BB-1b) of propylene, ethylene and the α-olefin having 4 to 20 carbon atoms has a melting point (Tm) as measured by DSC of 509° C. or less or has no observed melting point. The measurement of the melting point may be carried out by the same method as that of the first graft-modified propylene-based polymer (BB) and the like.

As regards the amounts of the propylene component and other comonomer components in the random copolymer of propylene, ethylene and the α-olefin having 4 to 20 carbon atoms in the graft-modified random copolymer (BB-1b) of propylene, ethylene and the α-olefin having 4 to 20 carbon atoms, the random copolymer preferably contains 60 to 82 mol % and more preferably 61 to 75 mol % of constituent units derived from propylene; 8.0 to 15 mol % and more preferably 10 to 14 mol % of constituent units derived from ethylene; and 10 to 25 mol % and more preferably 15 to 25 mol % of constituent units derived from the α-olefin having 4 to 20 carbon atoms (here, the total of constituent units derived from propylene, ethylene and the α-olefin having 4 to 20 carbon atoms is 100 mol %). As the α-olefin having 4 to 20 carbon atoms, 1-butene is especially preferably used.

Such graft-modified random copolymer (BB-1b) of propylene, ethylene and the α-olefin having 4 to 20 carbon atoms may be produced, for example, by graft-modifying the random copolymer (C-1b) of propylene, ethylene and the α-olefin having 4 to 20 carbon atoms described in the section of the first thermoplastic polymer composition, with at least one compound selected from the group consisting of a vinyl compound containing a polar group and a silane compound. Alternatively, the graft-modified random copolymer (BB-1b) may be produced by blending a graft-modified product of the random copolymer (C-1b) of propylene and the α-olefin having 4 to 20 carbon atoms with the random copolymer (B-2) of propylene and the α-olefin having 4 to 20 carbon atoms described in the section of the first thermoplastic polymer composition.

By use of the modified random copolymer (C-1b) of propylene, ethylene and the α-olefin having 4 to 20 carbon atoms, the obtainable thermoplastic polymer composition is more excellent in flexibility, scratch resistance and whitening resistance, and also excellent in low temperature brittleness resistance. In addition, the thermoplastic polymer composition can give a shaped article, for example electric cable, which has an advantage that the coating of the electric cable is unlikely to be broken even when exposed to a low temperature.

As described above, the graft-modified propylene-based polymer (BB) is partly or fully graft-modified with at least one compound selected from the group consisting of a vinyl compound containing a polar group and a silane compound, and has a melting point, as measured by differential scanning calorimetry (DSC), of less than 120° C. or has no observed melting point. Examples of the vinyl compounds containing a polar group and silane compounds used in the production of the graft-modified propylene-based polymer include those used in the production of the graft-modified propylene-based polymer (C) in the first thermoplastic polymer composition of the invention. The graft-modifying (graft copolymerizing) methods and the radical initiators are as described in the section of the production of the graft-modified propylene-based polymer (C) in the first thermoplastic polymer composition of the present invention.

The graft-modified propylene-based polymer (BB) used in the present invention is partly or fully graft-modified with at least one compound selected from the group consisting of a vinyl compound containing a polar group and a silane compound, and has a melting point, as measured by differential scanning calorimetry (DSC), of less than 120° C. or has no observed melting point. The graft amount of the vinyl compound containing a polar group and the silane compound is not particularly limited but is typically 0.01 to 10% by weight and preferably 0.05 to 5% by weight relative to 100 parts by weight of the modified propylene-based polymer (BB). By use of the graft-modified propylene-based polymer (BB) in the present invention, the obtainable shaped article is excellent especially in balance between tensile strength and scratch resistance.

The inorganic filler (D), and optional components such as ethylene-based polymer (E) and oil (F) are as described in the first thermoplastic polymer composition.

<Second Thermoplastic Polymer Composition and Second Shaped Article>

The second thermoplastic polymer composition of the present invention contains 5.0 to 64.9% by weight, preferably 5.0 to 49.9% by weight of the propylene-based polymer (A); 0.1 to 60% by weight, preferably 10.1 to 40% by weight of the graft-modified propylene-based polymer (BB); and 35 to 75% by weight, preferably 40 to 60% by weight of the inorganic filler (D) (here, the total amount of (A), (BB) and (D) is 100% by weight).

Further, the thermoplastic polymer composition may contain the ethylene-based polymer (E). For example, the copolymer (E-1) of ethylene with the α-olefin having 3 to 10 carbon atoms or the graft-modified ethylene-based polymer (E-2) may be used in an amount of 0.1 to 20 parts by weight relative to 100 parts by weight of the total amount of the components (A), (BB) and (D). If the amount of the ethylene-based polymer (E-1) is within this range, low temperature characteristics are significantly improved.

Further, the oil (F) may be used in the present invention in an amount of 0.1 to 20 parts by weight relative to 100 parts by weight of the total amount of the components (A), (BB) and (D). If the amount of the oil (F) is within this range, low temperature characteristics are significantly improved and the oil is unlikely to bleed out on the surface of the shaped article.

The second thermoplastic polymer composition of the present invention may contain additives as required while still achieving the objects of the invention. Examples of the additives include synthetic resins, rubbers, antioxidants, heat stabilizers, weather stabilizers, slip agents, antiblocking agents, nucleating agents, pigments, hydrochloric acid absorbers, and copper inhibitors. The amounts of such synthetic resins, rubbers and additives are not particularly limited as long as the objects of the present invention are not impaired. In a preferred embodiment, the components (A), (BB), and (D) are contained so that the total of them is 60 to 100% by weight of the thermoplastic polymer composition. The balance is accounted for by the above-mentioned components such as synthetic resins, rubbers, additives, ethylene-based polymer (E), and oil (F).

<Methods of Producing Thermoplastic Polymer Compositions>

The first and second thermoplastic polymer compositions of the present invention may be produced by conventionally known methods. For example, they may be produced by melt-kneading the components described above.

In producing the first thermoplastic polymer composition, it is preferable that the graft-modified propylene-based polymer (C) and the ethylene-based polymer (E) are melt-kneaded to produce a propylene-based polymer composition (G), and the propylene-based polymer composition (G) is melt-kneaded with components including the inorganic filler (D), propylene-based polymer (A) and optional propylene-based polymer (B). The production in this manner is preferable because the scratch resistance may be further improved while maintaining other physical properties.

Part of (C) or (E) may not be melt-blended beforehand, and may be supplied together with the component (A) and the like separately from the propylene-based polymer composition (G) (melt-kneaded product). However, the highest effects may be achieved when the components (C) and (E) are all melt-kneaded into the propylene-based polymer composition (G) (melt-kneaded product).

Further, in producing the second thermoplastic polymer composition, it is preferable that the graft-modified propylene-based polymer (BB) and the ethylene-based polymer (E) are melt-kneaded to produce a propylene-based polymer composition (GG), and the propylene-based polymer composition (GG) is melt-kneaded with components including the inorganic filler (D) and propylene-based polymer (A). The production in this manner is preferable because the scratch resistance may be further improved while maintaining other physical properties.

Part of (BB) or (E) may not be melt-blended beforehand, and may be supplied together with the component (A) and the like separately from the propylene-based polymer composition (GG) (melt-kneaded product). However, the highest effects may be achieved when the components (BB) and (E) are all melt-kneaded into the propylene-based polymer composition (GG) (melt-kneaded product).

<Shaped Articles>

First and second shaped articles of the present invention comprise the thermoplastic polymer compositions as mentioned above. The thermoplastic polymer compositions may be formed into various shapes by conventionally known melt-forming methods. Examples of the melt-forming methods include, for example, extrusion, rotational molding, calendering, injection molding, compression molding, transfer molding, powder molding, blow molding, and vacuum forming. The shaped articles may be composite products with shaped articles comprising other materials, for example, layered products.

The first and second shaped articles may be suitably used as, for example, electric cable coatings such as an insulator of an electric cable and an electric cable sheath. The coating layers such as the insulator of an electric cable and the electric cable sheath may be formed around electric wires by conventionally known methods, for example, extrusion.

First and second electric cables of the present invention have an insulator comprising the thermoplastic polymer composition as mentioned above and/or a sheath comprising the thermoplastic polymer composition as mentioned above. Especially, the electric cable is preferably an electric cable for an automobile or an electric cable for an instrument.

The thermoplastic polymer compositions as mentioned above may be suitably used for building materials.

EXAMPLES

Hereinafter, the present invention will be explained in more detail with reference to Examples. However, the present invention is not limited to these Examples.

Examples

Components (A) to (F)

(A) Propylene-Based Polymer

As an isotactic random polypropylene (r-PP), a propylene/ethylene/1-butene random copolymer (Tm: 140° C., melt flow rate (temperature 230° C., load 2.16 kg): 7 g/10 min, mmmm (stereoregularity, pentad isotacticity): 0.96, Mw/Mn: 4.8) was used.

(B) Propylene-Based Polymer (B-1) Propylene/1-Butene Copolymer (PBR)

To a 2000 ml polymerization device thoroughly purged with nitrogen were added 866 ml of dried hexane, 90 g of 1-butene and triisobutylaluminum (1.0 mmol) at room temperature. After the inside temperature of the polymerization device was elevated to 65° C., propylene was fed so that the pressure inside the device became 0.7 MPa. Subsequently, to the polymerization device was added a toluene solution in which 0.002 mmol of dimethylmethylene (3-tert-butyl-5-methylcyclopentadienyl) flu orenyl zirconium dichloride was contacted with 0.6 mmol in terms of aluminum of methylaluminoxane (manufactured by Tosoh Finechem Corporation). The polymerization was performed for 30 minutes while keeping the inside temperature at 65° C. and the propylene pressure at 0.7 MPa, followed by addition of 20 ml of methanol to stop the polymerization. After depressurizing, the polymer was precipitated from the polymerization solution in 2 L of methanol and dried under vacuum at 130° C. for 12 hours. The resulting polymer had a weight of 12.5 g, a butene content of 2.9 mol %, a melting point of 74.4° C., a MFR (temperature 230° C., load 2.16 kg) of 7 g/10 min, a Mw/Mn of 2.10 and an mm value of 90%.

In the present invention, a copolymer (B-1) obtained by scaling up the above method was pelletized for use. The properties of the propylene/1-butene copolymer (B-1) (PBR) used are shown in Table 1.

[Table 1]

TABLE 1

| Propylene/1-butene copolymer (PBR) | (B-1) |
| --- | --- |
| MFR (g/10 min) (Temperature 230° C., Load 2.16 kg) | 7.0 |
| Melting Point (° C.) | 75 |
| Mw/Mn | 2.1 |
| 1-Butene content (mol %) | 26 |

(B-2) Propylene/Ethylene/1-Butene Copolymer (PBER)

To a 2000 ml polymerization device thoroughly purged with nitrogen were added 917 ml of dried hexane, 85 g of 1-butene and triisobutylaluminum (1.0 mmol) at room temperature. After the inside temperature of the polymerization device was elevated to 65° C., propylene was fed so that the pressure inside the system became 0.77 MPa. Subsequently, ethylene was fed so that the pressure inside the system became 0.78 MPa.

Next, to the polymerization device was added a toluene solution in which 0.002 mmol of dimethylmethylene (3-tertbutyl-5-methylcyclopentadienyl) fluorenyl zirconium dichloride was contacted with 0.6 mmol in terms of aluminum of methylaluminoxane (manufactured by Tosoh Finechem Corporation). The polymerization was performed for 20 minutes while keeping the inside temperature at 65° C. and the pressure inside the system at 0.78 MPa with ethylene, followed by addition of 20 ml of methanol to stop the polymerization. After depressurizing, the polymer was precipitated from the polymerization solution in 2 L of methanol and dried under vacuum at 130° C. for 12 hours. The resulting polymer had a weight of 60.4 g.

In the present invention, a copolymer (B-2) obtained by scaling up the above method was pelletized for use. The properties of the propylene/ethylene/1-butene random copolymer (B-2) (PBER) used are shown in Table 2. The mm value was 92%.

[Table 2]

TABLE 2

| Propylene/ethylene/1-butene random copolymer (PBER) | (B-2) |
|---|---|
| MFR (g/10 min) (Temperature 230° C., Load 2.16 kg) | 8.5 |
| Melting Point (° C.) | Not observed |
| Mw/Mn | 2.0 |
| Ethylene content (mol %) | 13 |
| 1-Butene content (mol %) | 19 |

(C) Graft-Modified Propylene-Based Polymer (C-X) Maleic Anhydride-Grafted Propylene/1-Butene Copolymer (Modified C-1a)

The propylene/1-butene copolymer (B-1) having the properties described in Table 1 was used as a propylene-based polymer (C-1a) which was a raw material for modification. 6 kg of this propylene/1-butene copolymer was blended with a solution of 30 g of maleic anhydride and 5.4 g of 2,5-dimethyl-2,5-di(t-butylperoxy)-3-hexyne in 50 g of acetone.

Subsequently, the resulting blended product was introduced into a single-screw extruder having a screw diameter of 40 mm and an L/D of 26 through a hopper of the extruder. The blended product was extruded into a strand shape at a resin temperature of 250° C. and a throughput of 6 kg/h. Next, the extruded product was cooled with water and pelletized to produce a maleic anhydride-grafted propylene/1-butene copolymer (C-X). This (C-X) had a Tm as measured by DSC of 70° C. and a melt flow rate (temperature 190° C., load 2.16 kg) of 15 g/10 min.

The unreacted maleic anhydride was extracted from the resulting maleic anhydride-grafted propylene/1-butene copolymer (C-X) with acetone, and the graft amount of the maleic anhydride in this copolymer was measured to be 0.17% by weight.

(C-Y) Maleic Anhydride-Grafted Propylene/Ethylene/1-Butene Copolymer (Modified C-1b)

The propylene/ethylene/1-butene copolymer (B-2) having the properties described in Table 2 was used as a propylene-based polymer (C-1b) which was a raw material for modification. 6 kg of this propylene/ethylene/1-butene copolymer was blended with a solution of 30 g of maleic anhydride and 5.4 g of 2,5-dimethyl-2,5-di(t-butylperoxy)-3-hexyne in 50 g of acetone. Subsequently, the resulting blended product was introduced into a single-screw extruder having a screw diameter of 40 mm and an L/D of 26 through a hopper of the extruder. The blended product was extruded into a strand shape at a resin temperature of 250° C. and a throughput of 6 kg/h.

Next, the extruded product was cooled with water and pelletized to produce a maleic anhydride-grafted propylene/ethylene/1-butene copolymer (C-Y). This (C-Y) had no melting point as measured by DSC and a melt flow rate (temperature 190° C., load 2.16 kg) of 23 g/10 min. The unreacted maleic anhydride was extracted from the resulting maleic anhydride-grafted propylene/ethylene/1-butene copolymer (C-Y) with acetone, and the graft amount of the maleic anhydride in this copolymer was measured to be 0.17% by weight.

(C-Z) Modified Polypropylene

A modified PP obtained by modifying a homopolypropylene having a Tm of 157° C. and an intrinsic viscosity [η] of 0.4 dl/g with maleic anhydride was used. The graft amount of maleic anhydride was 3.0% by weight.

(D) Inorganic Filler

Magnesium hydroxide ($Mg(OH)_2$, product name: KISUMA 5P, produced by Kyowa Chemical Industry Co., Ltd.) was used.

(E) Ethylene-Based Polymer

An ethylene/1-butene copolymer (E-1) having the properties described in Table 3 was blended with a solution of 50 g of maleic anhydride and 3 g of di-tert-butyl peroxide in 50 g of acetone. Subsequently, the resulting blended product was introduced into a single-screw extruder having a screw diameter of 40 mm and an L/D of 26 through a hopper of the extruder. The blended product was extruded into a strand shape at a resin temperature of 250° C. and a throughput of 6 kg/h.

Next, the extruded product was cooled with water and pelletized to produce a maleic anhydride-grafted ethylene/1-butene copolymer (E-2).

[Table 3]

TABLE 3

| Ethylene/1-butene copolymer (EBR) | (E-1) |
|---|---|
| Density (kg/m³) | 870 |
| MFR (g/10 min) (Temperature 230° C., Load 2.16 kg) | 1.2 |
| Melting Point (° C.) | 59 |
| Mw/Mn | 2.1 |

The unreacted maleic anhydride was extracted from the resulting maleic anhydride-grafted ethylene/1-butene copolymer (E-2) with acetone, and the graft amount of the maleic anhydride in this copolymer was measured to be 0.43% by weight.

<Methods for Measuring Physical Properties of Components>

Physical properties of each component were measured as follows.

(1) The comonomer (ethylene and 1-butene) contents and mmmm (stereoregularity, pentad isotacticity) were determined by the analysis of $^{13}$C-NMR spectra.

(2) Melt Flow Rate (MFR)

The MFR was measured at 190° C. or 230° C. under a load of 2.16 kg, in accordance with ASTM D-1238.

(3) Melting Point (Tm)

Exothermic and endothermic curves were obtained by DSC, and the Tm was defined as a temperature at a maximum melting peak where ΔH in the temperature rising was 1 J/g or higher. The exothermic and endothermic curves were recorded by a series of steps in which a sample in an aluminum pan was heated to 200° C. at an elevation rate of 100° C./min and held at 200° C. for 5 minutes, and then the sample was cooled to −150° C. at a cooling rate of 10° C./min and heated again to 200° C. at an elevation rate of 10° C./min.

(4) Molecular Weight Distribution (Mw/Mn)

The molecular weight distribution (Mw/Mn) was measured as follows by using gel permeation chromatograph Alliance GPC-2000 System manufactured by Waters Corp. The separation column consisted of two TSK gel GNH6-HT columns and two TSK gel GNH6-HTL columns (each 7.5 mm in diameter×300 mm in length). The column temperature was 140° C. The mobile phase consisted of o-dichlorobenzene (Wako Pure Chemical Industries Inc.) and 0.025% by weight of BHT (Takeda Pharmaceutical Co., Ltd.) as an anti-oxidant, and was flowed at a rate of 1.0 ml/min. The sample concentration was 15 mg/10 mL, the sample injection amount was 500 μL, and a differential refractometer was used as a detector. Polystyrene standards manufactured by Toso Co., Ltd. were used for Mw<1000 and Mw>4×10$^6$, and those manufactured by Pressure Chemical Co., Ltd. were used for 1000≤Mw≤4×10$^6$.

(5) Density

The density was measured in accordance with a method described in ASTM D1505.

(6) Degree of Crystallinity

By using RINT2500 (manufactured by Rigaku Corp.) as a measurement device, the degree of crystallinity was determined by the analysis of a wide-angle X-ray profile measured using CuKα as an X-ray source.

(7) Shore A Hardness

The Shore A hardness was measured under the following conditions in accordance with JIS K6301. A sheet was prepared with a press molding machine. The sheet was tested on an A-type hardness meter, and a reading was taken immediately after a pressure needle contacted the sheet.

(8) Intrinsic Viscosity [η]

A polymer sample was dissolved in decalin, and the solution was measured for viscosity at 135° C. with an Ubbelohde type viscometer. The intrinsic viscosity was determined from the measurement value.

Evaluation Items of Examples 1 and 2, Reference Example 1 and Comparative Examples 1 and 2

(1) Tensile Strength at Break (TS) and Elongation at Break (EL)

The tensile strength at break (TS) and elongation at break (EL) were measured for a test piece prepared with an injection molding machine in accordance with JIS K7113-2.

(2) Brittle Temperature (Btp)

The brittle temperature was measured for a sheet 3 mm in thickness prepared with an injection molding machine in accordance with ASTM D746.

(3) D Hardness (HD-D)

A sheet prepared with an injection molding machine was tested using a D-type hardness meter in accordance with ASTM D2240, and a reading was taken immediately after a pressure needle contacted the sheet.

(4) Scratch Resistance

A scrape abrasion tester (manufactured by Yasuda Seiki Seisakusho Ltd.) was used. A SUS abrasion indenter weighing 700 g was attached at the tip of the tester. A test piece with a thickness of 3 mm was abraded with a piano wire fixed to the tip of the abrasion indenter at room temperature by reciprocating the indenter 1000 times at a reciprocation speed of 60 cpm with a stroke of 10 mm. The test sample was weighed before and after abrading, and the abraded weight loss was determined. The smaller the value is, the more excellent the scratch resistance is.

Examples 1 to 5

The material components in the amounts described in Table 4 were dry blended using a Henschel mixer, and the blended product was melt-kneaded with a twin-screw extruder having a diameter of 30 mm at 210° C. to produce a composition. The pellets obtained were formed into a test piece by using an injection molding machine. The tensile properties, brittle temperature, scrape abrasion and D hardness were tested. The results are shown in Table 4.

Example 6

The maleic anhydride-grafted propylene/1-butene copolymer (C-X) as graft-modified propylene-based polymer (C) and the ethylene/1-butene copolymer (E-1) as ethylene-based polymer (E) were kneaded together at 190° C. by using a Labo Plastomill (manufactured by Toyo Seiki Co., Ltd.). As a result, a propylene-based polymer composition (G) shown below was produced.

(G) Propylene-Based Polymer Composition

Maleic Anhydride-Grafted Propylene/1-Butene Copolymer (C-X)/Ethylene/1-Butene Copolymer (E-1)=80/20 (% by Weight)

A composition was prepared and evaluated in the same manner as in Example 1, except that the components and amounts thereof were changed as described in Table 4. The results are shown in Table 4.

TABLE 4

| | Unit | Ex. 1 | Ex. 2 | Ex. 3 | Ex. 4 | Ex. 5 | Ex. 6 |
|---|---|---|---|---|---|---|---|
| (A) r-PP | % by weight | 30 | 30 | 30 | 45 | 40 | 30 |
| (B-1) PBR | % by weight | | | | | 5 | |
| (C-X) Modified PBR | % by weight | 16 | | 20 | 5 | 5 | |
| (C-Y) Modified PBER | % by weight | | 16 | | | | |
| (C-Z) Modified PP | % by weight | | | | | | |
| (E-1) EBR | % by weight | 4 | 4 | | | | |
| (E-2) Modified EBR (G) | % by weight | | | | | | 20 |
| (D) Mg(OH)$_2$ | % by weight | 50 | 50 | 50 | 50 | 50 | 50 |
| Tensile Strength at Break | MPa | 32.0 | 18.0 | 35 | 26 | 25 | 34 |
| Elongation at Break | % | 491 | 470 | 500 | 270 | 390 | 510 |
| Brittle temperature | ° C. | −40 | −35 | −21 | −16 | −17 | −40 |
| D Hardness | — | 54 | 50 | 57 | 61 | 59 | 54 |
| Abraded Weight Loss | mg | 0.2 | 1.1 | 0.1 | 0.1 | 0.1 | 0.2 |

Comparative Examples 1 to 4

Compositions were prepared and evaluated in the same manner as in Example 1, except that the components and amounts thereof were changed as described in Table 5. The results are shown in Table 5.

[Table 5]

TABLE 5

| | Unit | Comp. Ex. 1 | Comp. Ex. 2 | Comp. Ex. 3 | Comp. Ex. 4 |
|---|---|---|---|---|---|
| (A) r-PP | % by weight | 30 | 29 | 30 | 30 |
| (B-1) PBR | % by weight | | 16 | 16 | 16 |
| (C-X) Modified PBR | % by weight | | | | |
| (C-Y) Modified PBER | % by weight | | | | |
| (C-Z) Modified PP | % by weight | | | 1 | |

TABLE 5-continued

|  | Unit | Comp. Ex. 1 | Comp. Ex. 2 | Comp. Ex. 3 | Comp. Ex. 4 |
|---|---|---|---|---|---|
| (E-1) EBR | % by weight |  | 4 | 4 |  |
| (E-2) Modified EBR | % by weight | 20 |  |  | 4 |
| (D) Mg(OH)$_2$ | % by weight | 50 | 50 | 50 | 50 |
| Tensile Strength at Break | MPa | 16.0 | 23.1 | 20.6 | 23 |
| Elongation at Break | % | 280 | 440 | 500 | 440 |
| Brittle temperature | °C. | −74 | −32 | −43 | −42 |
| D Hardness | — | 43 | 54 | 51 | 52 |
| Abraded Weight Loss | mg | 2.8 | 1.6 | 1.9 | 0.8 |

The propylene-based resin compositions according to the present invention proved excellent tensile strength at break, elongation at break and scratch resistance when they contained the inorganic filler (for example, magnesium hydroxide), compared with the ethylene-based resin compositions of Comparative Examples.

INDUSTRIAL APPLICABILITY

The thermoplastic polymer compositions of the present invention contain the inorganic filler in a high ratio and have good flexibility as well as excellent mechanical strength, elongation at break and scratch resistance. Further, because the thermoplastic polymer compositions of the present invention contain the inorganic filler in a high ratio, the compositions may be widely used for the production of flame retardant shaped articles, for example electric cables and building materials.

What is claimed is:

1. A thermoplastic polymer composition comprising the following (A) to (D);
   (A) 5 to 64.9% by weight of a propylene-based polymer having a melting point, as measured by differential scanning calorimetry (DSC), in the range of 120° C. to 170° C.;
   (B) 0 to 59.9% by weight of a propylene-based polymer having a melting point, as measured by differential scanning calorimetry (DSC), of less than 120° C. or having no observed melting point;
   (C) 0.1 to 30% by weight of a graft-modified propylene-based polymer obtained by graft modifying a propylene-based polymer (C-1) having a melting point, as measured by differential scanning calorimetry (DSC), of less than 120° C. or having no observed melting point, with at least one vinyl compound containing a polar group; and
   (D) 35 to 75% by weight of an inorganic filler,
   wherein, the total amount of (A), (B), (C) and (D) is 100% by weight;
   wherein the propylene-based polymer (C-1) is
      a copolymer (C-1a) of propylene with an α-olefins having 4 to 20 carbon atoms which satisfies the following (i) and (ii):
         (i) the molecular weight distribution (Mw/Mn) as measured by gel permeation chromatography (GPC) is in the range of 1 to 3;
         (ii) the melting point (Tm)(° C.) and the content M (mol %) of constituent units derived from the comonomer as determined by $^{13}$C-NMR spectrum satisfy the following relation (1), and the Tm is less than 120° C., and $$146\exp(-0.022M) \geq Tm \geq 125\exp(-0.032M) \quad (1)$$

which contains 50 to 90 mol % of constituent units derived from propylene and 10 to 50 mol % of constituent units derived from the α-olefins having 4 to 20 carbon atoms (the total of propylene and the α-olefins having 4 to 20 carbon atoms is 100 mol %), or
   a random copolymer (C-1b) of propylene, ethylene and an α-olefin having 4 to 20 carbon atoms which satisfies the following (m) and (n):
      (m) the molecular weight distribution (Mw/Mn) as measured by gel permeation chromatography (GPC) is in the range of 1 to 3;
      (n) the random copolymer (C-1b) contains 60 to 85 mol % of constituent units derived from propylene, 5 to 30 mol % of constituent units derived from ethylene and 5 to 30 mol % of constituent units derived from the α-olefin having 4 to 20 carbon atoms, and the total of constituent units derived from propylene, constituent units derived from ethylene and constituent units derived from the α-olefin having 4 to 20 carbon atoms is 100 mol %;
   wherein the vinyl compound containing a polar group is an unsaturated carboxylic acid or a derivative thereof, the derivative being selected from the group consisting of acid halide compounds, amide compounds, imide compounds and acid anhydrides; and
   wherein the graft amount of the vinyl compound having a polar group in the graft-modified propylene-based polymer (C) obtained is 0.05 to 5% by weight.

2. The thermoplastic polymer composition according to claim 1, wherein said inorganic filler (D) is one or more kinds of fillers selected from the group consisting of talc, metal hydroxides, and metal oxides.

3. The thermoplastic polymer composition according to claim 1, wherein the composition further includes 0.1 to 20 parts by weight of an ethylene-based polymer (E), relative to the total 100 parts by weight of the propylene-based polymer (A), the propylene-based polymer (B), the graft-modified propylene-based polymer (C) and the inorganic filler (D).

4. The thermoplastic polymer composition according to claim 1, wherein the composition further includes 0.1 to 20 parts by weight of oil (F), relative to the total 100 parts by weight of the propylene-based polymer (A), the propylene-based polymer (B), the graft-modified propylene-based polymer (C) and the inorganic filler (D).

5. A method of producing the thermoplastic polymer composition of claim 3, which comprises melt-kneading the graft-modified propylene-based polymer (C) with the ethylene-based polymer (E) to produce a propylene-based polymer composition (G), and melt-kneading the propylene-based polymer composition (G) with components including the inorganic filler (D) and the propylene-based polymer (A).

6. A method of producing the thermoplastic polymer composition of claim 3, which comprises melt-kneading the graft-modified propylene-based polymer (C) with the ethylene-based polymer (E) to produce a propylene-based polymer composition (G), and melt-kneading the propylene-based polymer composition (G) with components including the inorganic filler (D), the propylene-based polymer (A) and the propylene-based polymer (B).

7. A thermoplastic polymer composition obtained by the production method of claim 5.

8. A shaped article comprising the thermoplastic polymer composition described in claim 1.

9. The shaped article according to claim 8, wherein said shaped article is an insulator of an electric cable or an electric cable sheath.

10. An electric cable having an insulating material comprising the thermoplastic polymer composition described in claim 1.

11. The electric cable according to claim 10, wherein said electric cable is an electric cable for a vehicle, an electric cable for an automobile, or an electric cable for an instrument.

12. A thermoplastic polymer composition comprising the following (A), (BB) and (D):
- (A) 5 to 64.9% by weight of a propylene-based polymer having a melting point, as measured by differential scanning calorimetry (DSC), in the range of 120° C. to 170° C.;
- (BB) 0.1 to 60.0% by weight of a graft-modified propylene-based polymer which is partly or fully graft-modified with at least one vinyl compound containing a polar group, and which has a melting point, as measured by differential scanning calorimetry (DSC), of less than 120° C. or has no observed melting point; and
- (D) 35 to 75% by weight of an inorganic filler, wherein the total amount of (A), (BB) and (D) is 100% by weight;

wherein the graft-modified propylene-based polymer (BB) is
- a graft-modified product (BB-1a) of a random copolymer of propylene with an α-olefin having 4 to 20 carbon atoms, the random copolymer containing 10 to 50 mol % of constituent units derived from the α-olefin having 4 to 20 carbon atoms relative to 100 mol % of the total of the constituent units derived from propylene and the constituent units derived from the α-olefin having 4 to 20 carbon atoms, or
- a graft-modified product (BB-1b) of a random copolymer of propylene, ethylene and an α-olefin having 4 to 20 carbon atoms, the random copolymer containing 60 to 85 mol % of constituent units derived from propylene, 5 to 30 mol % of constituent units derived from ethylene and 5 to 30 mol % of constituent units derived from the α-olefin having 4 to 20 carbon atoms relative to 100 mol % of the total of the constituent units derived from propylene, the constituent units derived from ethylene and the constituent units derived from the α-olefin having 4 to 20 carbon atoms;

wherein the vinyl compound containing a polar group is an unsaturated carboxylic acid or a derivative thereof, the derivative being selected from the group consisting of acid halide compounds, amide compounds, imide compounds and acid anhydrides; and wherein the graft amount of the vinyl compound containing a polar group is 0.05 to 5% by weight of the graft-modified propylene-based polymer (BB).

13. The thermoplastic polymer composition according to claim 12, wherein said graft-modified propylene-based polymer (BB) has a melt flow rate in the range of 0.01 to 100 g/10 min, as measured at 190° C. under a load of 2.16 kg.

14. The thermoplastic polymer composition according to claim 12, wherein said inorganic filler (D) is one or more kinds of fillers selected from the group consisting of talc, metal hydroxides, and metal oxides.

15. The thermoplastic polymer composition according to claim 12, wherein the composition further includes 0.1 to 20 parts by weight of an ethylene-based polymer (E), relative to the total 100 parts by weight of the propylene-based polymer (A), the graft-modified propylene-based polymer (BB) and the inorganic filler (D).

16. The thermoplastic polymer composition according to claim 12, wherein the composition further includes 0.1 to 20 parts by weight of oil (F), relative to the total 100 parts by weight of the propylene-based polymer (A), the graft-modified propylene-based polymer (BB) and the inorganic filler (D).

17. A method of producing the thermoplastic polymer composition of claim 15, which comprises melt-kneading the graft-modified propylene-based polymer (BB) with the ethylene-based polymer (E) to produce a propylene-based polymer composition (GG), and melt-kneading the propylene-based polymer composition (GG) with components including the inorganic filler (D) and the propylene-based polymer (A).

18. A thermoplastic polymer composition obtained by the production method of claim 17.

19. A shaped article comprising the thermoplastic polymer composition described in claim 12.

20. The shaped article according to claim 19, wherein said shaped article is an insulator of an electric cable or an electric cable sheath.

21. An electric cable having an insulating material comprising the thermoplastic polymer composition described in claim 12.

22. The electric cable according to claim 21, wherein said electric cable is an electric cable for a vehicle, an electric cable for an automobile, or an electric cable for an instrument.

23. The thermoplastic polymer composition according to claim 1 or 12, wherein the vinyl compound containing a polar group is selected from the group consisting of anhydrous maleic acid and anhydrous citraconic acid.

* * * * *